US012637358B2

(12) United States Patent
Tian et al.

(10) Patent No.: US 12,637,358 B2
(45) Date of Patent: May 26, 2026

(54) PRUSSIAN BLUE-LIKE TRANSITION METAL CYANIDE, PREPARATION METHOD THEREFOR, AND RELATED POSITIVE ELECTRODE PLATE, SECONDARY BATTERY, BATTERY MODULE, BATTERY PACK AND DEVICE

(71) Applicant: CONTEMPORARY AMPEREX TECHNOLOGY (HONG KONG) LIMITED, Hong Kong (CN)

(72) Inventors: Jiarui Tian, Ningde (CN); Yongsheng Guo, Ningde (CN); Chuying Ouyang, Ningde (CN); Xinxin Zhang, Ningde (CN); Liting Huang, Ningde (CN); Shuojian Su, Ningde (CN); Wenguang Lin, Ningde (CN); Jinyu Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 550 days.

(21) Appl. No.: 18/124,021

(22) Filed: Mar. 21, 2023

(65) Prior Publication Data

US 2023/0227321 A1 Jul. 20, 2023

Related U.S. Application Data

(63) Continuation of application No. PCT/CN2021/128648, filed on Nov. 4, 2021.

(30) Foreign Application Priority Data

Dec. 8, 2020 (CN) .......................... 202011423372.7

(51) Int. Cl.
    *C01C 3/11* (2006.01)

(52) U.S. Cl.
CPC ............ *C01C 3/11* (2013.01); *C01P 2004/32* (2013.01); *C01P 2004/61* (2013.01); *C01P 2006/11* (2013.01); *C01P 2006/40* (2013.01)

(58) Field of Classification Search
CPC ....................................................... C01C 3/11
See application file for complete search history.

(56) References Cited

U.S. PATENT DOCUMENTS

| | | | | |
|---|---|---|---|---|
| 8,349,221 B2 * | 1/2013 | Kawamoto | ............ | C09D 11/38 556/136 |
| 2012/0077037 A1 * | 3/2012 | Kawamoto | .............. | C01C 3/12 423/364 |
| 2019/0131625 A1 * | 5/2019 | Wang | .................. | H01M 4/0471 |

FOREIGN PATENT DOCUMENTS

| | | |
|---|---|---|
| CN | 101704536 A | 5/2010 |
| CN | 104956527 A | 9/2015 |

(Continued)

OTHER PUBLICATIONS

Machine translation of CN 110078096 (no date) (Year: 0000).*

(Continued)

*Primary Examiner* — Amanda C. Walke
(74) *Attorney, Agent, or Firm* — XSENSUS LLP

(57) ABSTRACT

Embodiments of the present application provide a Prussian blue-like transition metal cyanide, a preparation method therefor, and related positive electrode plate, secondary battery, battery pack and device. The Prussian blue-like transition metal cyanide may comprise secondary particles which comprise a plurality of primary particles, wherein the primary particles may have a spherical or spherical-like morphology.

9 Claims, 4 Drawing Sheets

(56)  References Cited

FOREIGN PATENT DOCUMENTS

| | | | | | |
|----|----------------|---|---|---------|------------------|
| CN | 105836762 | A | | 8/2016 | |
| CN | 106469828 | A | | 3/2017 | |
| CN | 107021510 | A | | 8/2017 | |
| CN | 107039622 | A | | 8/2017 | |
| CN | 107240676 | A | | 10/2017 | |
| CN | 107364874 | A | | 11/2017 | |
| CN | 107364875 | A | | 11/2017 | |
| CN | 108212072 | A | | 6/2018 | |
| CN | 108217691 | A | | 6/2018 | |
| CN | 108676175 | A | | 10/2018 | |
| CN | 109698345 | A | | 4/2019 | |
| CN | 109761246 | A | | 5/2019 | |
| CN | 109841832 | A | | 6/2019 | |
| CN | 109851643 | A | | 6/2019 | |
| CN | 109920979 | A | | 6/2019 | |
| CN | 106469828 | B | | 7/2019 | |
| CN | 110078096 | A | | 8/2019 | |
| CN | 110412098 | A | | 11/2019 | |
| CN | 110451525 | A | | 11/2019 | |
| CN | 111017958 | A | * | 4/2020 | ............. H01M 4/58 |
| CN | 112174167 | A | * | 1/2021 | ............... C01C 3/12 |
| CN | 112259730 | A | | 1/2021 | |
| CN | 112723384 | A | * | 4/2021 | .......... H01M 10/054 |
| CN | 114873610 | A | * | 8/2022 | ............ H01M 10/36 |
| JP | 2016-091699 | A | | 5/2016 | |
| JP | 2017-534162 | A | | 11/2017 | |
| KR | 10-2020-0063642 | A | | 6/2020 | |
| WO | WO-2012110835 | A2 | * | 8/2012 | ............ A61K 49/08 |
| WO | 2016/157934 | A1 | | 10/2016 | |

OTHER PUBLICATIONS

Office Action issued Sep. 19, 2023 in Japanese Patent Application No. 2022-558232 with English translation thereof.

Extended European Search Report issued Nov. 29, 2023 in European Patent Application No. 21902277.9.

First Office Action mailed on Jan. 28, 2021, received for CN Application 202011423372.7, 14 pages including English Translation.

Second Office Action mailed on Feb. 22, 2021, received for CN Application 202011423372.7, 21 pages including English Translation.

International Search Report and Written Opinion mailed on Dec. 20, 2021, received for PCT Application PCT/CN2021/128648, filed on Nov. 4, 2021, 11 pages including English Translation.

Tang et al., "Hierarchical sodium-rich Prussian blue hollow nanospheres as high-performance cathode for sodium-ion batteries", Nano Research, vol. 11, No. 8, Jan. 25, 2018, pp. 3979-3983.

* cited by examiner

PRUSSIAN BLUE-LIKE TRANSITION METAL CYANIDE, PREPARATION METHOD THEREFOR, AND RELATED POSITIVE ELECTRODE PLATE, SECONDARY BATTERY, BATTERY MODULE, BATTERY PACK AND DEVICE

CROSS REFERENCE TO RELATED APPLICATIONS

The present application a continuation of International Application No. PCT/CN2021/128648, filed Nov. 4, 2021, which claims the priority of Chinese patent application no. 202011423372.7, entitled "Prussian blue-like transition metal cyanide, preparation method therefor, and related positive electrode plate, secondary battery, battery module, battery pack and device", filed on Dec. 8, 2020, the entire content of each of which is incorporated herein by reference.

TECHNICAL FIELD

The present application relates to the technical field of energy storage devices, in particular to a Prussian blue-like transition metal cyanide, a preparation method therefor, and related positive electrode plate, secondary battery, battery module, battery pack and device

BACKGROUND ART

In recent years, with the large-scale promotion of lithium ion batteries in emerging fields such as new energy vehicles and electrochemical energy storage around the world, the abundance of resources like lithium and some other precious metals such as cobalt and nickel has gradually aroused people's concern. This is because that the rapid growth in demand will reduce the reserves of these resources, or significantly increase the costs of extraction or exploitation. Therefore, researches focusing on the development of new electrochemical energy storage systems with high resource abundance to achieve low energy storage costs have been paid more and more attention.

Secondary batteries based on other systems represented by sodium ion batteries have similar energy storage principles to that of lithium ion batteries, except that the ions moving back and forth between positive and negative electrodes during charge/discharge cycling are changed from lithium ions to active ions such as sodium ions. Due to its high abundance, the element sodium has a potentially broad prospect of application, and particularly has a great potential value of application in the fields of low-speed electric vehicles and large-scale energy storage.

Positive electrode material is the most important component of secondary batteries such as sodium ion batteries. Positive electrode materials for use in the industrialization of sodium ion batteries mainly include the Prussian blue-like transition metal cyanides, layered transition metal oxides, polyanionic oxides, etc. Compared with other positive electrode materials, Prussian blue-like transition metal cyanides have three core advantages for industrialization, namely low cost, high specific capacity and convenient preparation, and has the greatest prospect of industrialization. However, Prussian blue-like transition metal cyanides still suffer from low capacity per gram compared to commonly used positive electrode materials for lithium ion batteries, resulting in poor energy density of sodium ion batteries, which affects the commercial application of sodium ion batteries.

SUMMARY

A first aspect of the present application provides a Prussian blue-like transition metal cyanide comprising secondary particles which comprise a plurality of primary particles; wherein the primary particles have spherical or spherical-like morphology.

The Prussian blue-like transition metal cyanide of the present application comprises secondary particles formed by agglomeration of a plurality of primary particles having spherical or spherical-like morphology, which can increase the particle granularity and the powder compacted density and also improve the compacted density of a positive electrode plate, and also improve the active ion transport performance and electronic conductivity of the positive electrode plate, thus improving the energy density and rate performance of the secondary battery using same.

In any embodiment of the present application, the secondary particles of the Prussian blue-like transition metal cyanide have an interior angle of 150°-300°, optionally 180°-270°, or 200°-250°. The Prussian blue-like transition metal cyanide with more obtuse angles on the surface of the particles is beneficial to increase the contact area between particles, increase the compacted density of the electrode plate, and improve the energy density and rate performance of the battery.

In any embodiment of the present application, in the secondary particles of the Prussian blue-like transition metal cyanide, the primary particles have a radius of curvature $\geq 0.2$ µm; optionally 0.5 µm-100 µm, or 0.8 µm-50 µm. An appropriate radius of curvature is beneficial to the increase of the compacted density of the electrode plate and thus can improve the rate performance and energy density of a battery.

In any embodiment of the present application, the Prussian blue-like transition metal cyanide has a volume-average particle size $D_v 50 \geq 1$ µm, optionally 2 µm-50 µm, or 2 µm-10 µm. An appropriate particle size range is beneficial to the increase of the compacted density of the electrode plate, and therefore it is helpful to improve the energy density and rate performance of a battery.

In any embodiment of the present application, the Prussian blue-like transition metal cyanide has a powder compacted density of 1.7 g/cm$^3$-2.1 g/cm$^3$, optionally 1.8 g/cm$^3$-2.1 g/cm$^3$ under the pressure of 600 MPa. The Prussian blue-like transition metal cyanide has a high powder compacted density, which is beneficial to the contact between particles and the conductive agent and also helps to improve the compacted density of the electrode plate, thus improving the energy density and rate performance of batteries.

In any embodiment of the present application, the Prussian blue-like transition metal cyanide includes $A_x M^1 [M^2 (CN)_6]_y$, wherein A is selected from one or more of alkali metal ions and alkaline earth metal ions; $M^1$ is selected from one or more of Mn, Ni, Cu, Co, Fe, Zn, and Cr; $M^2$ is selected from one or more of Mn, Ni, Cu, Co, Fe, Zn, and Cr; $1.5 \leq x \leq 2$; $0.6 \leq y \leq 1$. The small defect level of the Prussian blue-like transition metal cyanide, the higher capacity per gram, and the higher the energy density of the battery.

In any embodiment of the present application, the Prussian blue-like transition metal cyanide has a powder resistivity of 10 kΩ·cm-100 kΩ·cm, optionally 20 kΩ·cm-90 kΩ·cm under the pressure of 12 MPa. As the powder resistivity is in an appropriate range, the rate performance of a battery can be improved.

In any embodiment of the present application, the Prussian blue-like transition metal cyanide has a capacity per gram of 140 mAh/g-170 mAh/g, optionally 150 mAh/g-165 mAh/g. As the Prussian blue-like transition metal cyanide has a large capacity per gram, it can increase the energy density of a battery.

A second aspect of the present application provides a preparation method for the Prussian blue-like transition metal cyanide, including the following steps:

S1, providing a first solution comprising a transition metal cation, wherein the concentration of the transition metal cation in the first solution is ≥0.1 mol/L;

S2, providing a second solution comprising an A salt of transition metal cyanate, wherein the concentration of the transition metal cyanate anion in the second solution is ≥0.1 mol/L, and A is selected from one or more of alkali metal ions and alkaline earth metal ions;

S3, adding one of the first solution and the second solution to the other for mixing at a flow rate of 10 cm/s-100 m/s over 0.5 h-48 h while stirring, and a coprecipitation chemical reaction occurs to obtain a suspension; wherein the temperature of one of the solutions is 10° C.-40° C., and the temperature of the other is 40° C.-180° C.;

S4, aging the suspension for ≥0.5 h while stirring at 40° C.-180° C.;

S5, separating, washing and drying same to obtain the Prussian blue-like transition metal cyanide; wherein the Prussian blue-like transition metal cyanide comprises secondary particles which comprise a plurality of primary particles, the primary particles having a spherical or spherical-like morphology.

If the concentrations of the transition metal cation and the transition metal cyanate anion in the first solution and the second solution are high, the yield of the Prussian blue-like transition metal cyanide can be increased and the production cost can be reduced.

In any embodiment of the present application, the concentration of the transition metal cation in the first solution of S1 is 0.2 mol/L-4 mol/L, optionally 0.3 mol/L-3 mol/L.

In any embodiment of the present application, the concentration of the transition metal cyanate anion in the second solution of S2 is 0.2 mol/L-4 mol/L, optionally 0.3 mol/L-3 mol/L.

As the concentrations of the transition metal cation in the first solution and the transition metal cyanate anion in the second solution are in an appropriate range, such that the crystal concentration is thermodynamically lower than the saturation solubility, and they are in liquid phase to maintain a stable concentration for reaction, so as to obtain the Prussian blue-like transition metal cyanide of the present application.

In any embodiment of the present application, the first solution of S1 or the second solution of S2 can also comprise an A source, wherein the A source is selected from one or more of A chlorate, A nitrate, A sulfate, A hydroxide, A formate, A acetate, A oxalate, A phosphate, A perchlorate, A benzoate, and A citrate; optionally, the A source is selected from one or more of A chlorate, A nitrate and A sulfate.

The addition of the A source can accelerate the mobility of A towards the framework of the Prussian blue-like transition metal cyanide, which is beneficial to the structural integrity of the product, and thus can improve the capacity per gram of the Prussian blue-like transition metal cyanide, so as to improve the energy density of a battery.

In any embodiment of the present application, the first solution of S1 or the second solution of S2 comprises an antioxidant. The antioxidant can inhibit the transition metal from oxidizing in the reaction solution and reduce the probability that the products are doped with oxide impurities, and thus can improve the capacity per gram of the Prussian blue-like transition metal cyanide, so as to improve the energy density of a battery.

In any embodiment of the present application, the flow rate for mixing in S3 is 50 cm/s-10 m/s, optionally 1 m/s-5 m/s. When mixed in this flow rate range, the Prussian blue-like transition metal cyanide generated by the reaction has good dispersion, and the particles are not easy to excessively aggregate, but they are not excessively dispersed, which can make the primary particles form secondary particles in a spherical state, thus reducing the resistivity of the electrode plate and improving the compacted density of the electrode plate, so as to improve the energy density and rate performance of a battery.

In any embodiment of the present application, the mixing in S3 lasts 1 h-24 h, optionally 2 h-12 h. Mixing in this time range can make the Prussian blue-like transition metal cyanide have a larger particle size, thus reducing the resistivity of the electrode plate and also improving the compacted density of the electrode plate, which is beneficial to improve the energy density and rate performance of a battery.

In any embodiment of the present application, the temperature of the other solution in S3 is 60° C.-140° C., optionally 70° C.-110° C. The content of metal A and transition metal M2 in the chemical formula of the product can be increased by controlling the temperature of the solution, making the crystal structure more integral with fewer defects, such that the Prussian blue-like transition metal cyanide will exhibit high capacity per gram and the energy density of a battery can be improved.

In any embodiment of the present application, the temperature for aging in S4 is 60° C.-140° C., optionally 70° C.-110° C. Aging in this temperature range can further improve the capacity per gram of the Prussian blue-like transition metal cyanide and the energy density of a battery. Further, the rate performance of the battery can also be improved.

In any embodiment of the present application, in S4, the aging lasts 1 h-24 h, optionally 2 h-12 h. Aging in this time range can improve the proportion of Na content in the chemical formula of the product, which can further improve the capacity per gram of the Prussian blue-like transition metal cyanide and the energy density of a battery.

A third aspect of the present application provides a positive electrode plate comprising a positive electrode material, wherein the positive electrode material includes the Prussian blue-like transition metal cyanide according to the first aspect of the present application or the Prussian blue-like transition metal cyanide obtained according to the preparation method according to the second aspect of the present application.

Due to the use of the positive electrode material of the present application, the positive electrode plate of the present application can make the sodium ion battery using it have high energy density.

A fourth aspect of the present application provides a secondary battery comprising a positive electrode plate, wherein the positive electrode plate is the positive electrode plate according to the third aspect of the present application. Optionally, the secondary battery is a sodium ion battery.

Due to the use of the positive electrode plate of the present application, the secondary battery of the present application can have higher energy density.

A fifth aspect of the present application provides a battery module comprising the secondary battery according to the fourth aspect of the present application.

A sixth aspect of the present application provides a battery pack comprising the secondary battery according to the fourth aspect of the present application or the battery module according to the fifth aspect of the present application.

A seventh aspect of the present application provides a device comprising at least one of the secondary battery according to the fourth aspect of the present application, the battery module according to the fifth aspect of the present application, or the battery pack according to the sixth aspect of the present application.

The battery module, the battery pack and the device of the present application comprise the secondary battery of the present application and thus have at least the same or similar technical effects as the secondary battery.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

DETAILED DESCRIPTION OF EMBODIMENTS

Figure 1:
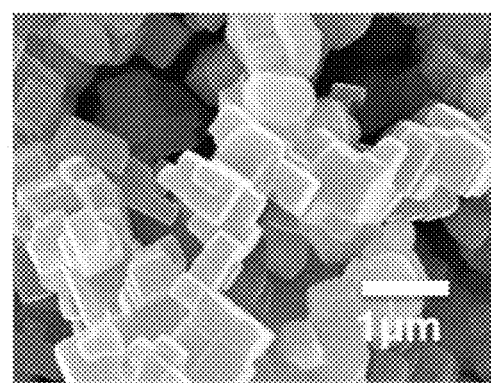
FIG. 1 is a scanning electron microscope (SEM) image of the Prussian blue-like transition metal cyanide obtained in comparative example 1.

In order to make the objectives, technical solutions and beneficial technical effects of the present application clearer, the present application will be described in detail below in conjunction with specific embodiments. It should be understood that the embodiments described in this specification are only for explaining the application, instead of intending to limit the application.

For the sake of brevity, merely some numerical ranges are explicitly disclosed herein. However, any lower limit may be combined with any upper limit to form a range that is not explicitly described; and any lower limit may be combined with any other lower limit to form a range that is not explicitly described, and any upper limit may be combined with any other upper limit to form a range that is not explicitly described. Further, although not explicitly specified, each point or single value between endpoints of a range is included in the range. Thus, each point or single value can be taken as a lower or upper limit to be combined with any other point or single value or with any other lower or upper limit to form a range that is not explicitly specified.

In the description herein, it should be noted that, unless otherwise stated, "no less than" and "no more than" means the endpoints preceded by them being included, and "more" in the phrase "one or more" means two or more.

In the description herein, unless otherwise stated, the term "or" is inclusive. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

The above summary of the present application is not intended to describe every disclosed embodiment or every implementation of the present application. The following description will illustrate exemplary embodiments in more detail. Throughout the application, teachings are provided by means of a number of embodiments, which can be used in various combinations. In each instance, a list is only a representative group and should not be interpreted as exhaustive.

The inventors have found through researches that the existing Prussian blue-like transition metal cyanide has the problems of low particle size, low powder compacted density and poor electrical conductivity, etc., which lead to low energy density of secondary batteries, increase of the production difficulty of secondary batteries and high requirements on equipment. The main reason for this phenomenon is that the morphology of the product obtained in the coprecipitation reaction stage is generally cubic, which makes the gap between the active material particles in an electrode plate large too big to be filled, and the connection between the active material particles and the conductive agent particles is not close. Therefore, how to enhance the contact between particles and narrow the gap is the key to improve the energy density of secondary batteries such as sodium ion batteries.

Figure 2:
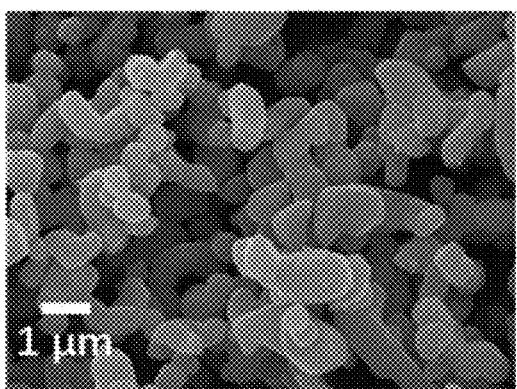
FIG. 2 is a scanning electron microscope (SEM) image of the Prussian blue-like transition metal cyanide obtained in example 1 according to some embodiments of the present application.

Therefore, the inventors have further carried out a lot of research and provided, in the first aspect of the present application, a Prussian blue-like transition metal cyanide comprising secondary particles which comprise a plurality of primary particles; wherein the primary particles have spherical or spherical-like morphology, as shown in FIG. 1 and FIG. 2.

In the present application, the primary particle and the secondary particle have the meanings that are well known in the art. The primary particles refer to particles that do not form an agglomerated state. The secondary particles refer to agglomerated particles formed by the agglomeration of two or more primary particles. The primary particles and secondary particles, as well as the particle morphology can be easily distinguished by SEM images taken by scanning electron microscope.

Figure 3:
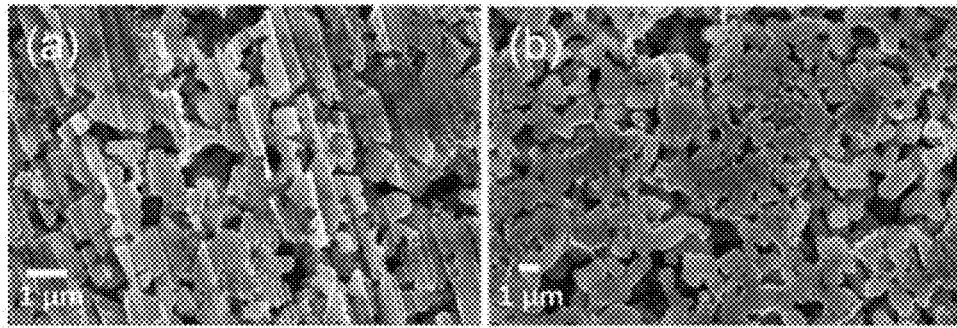
FIG. 3 is ion polishing cross-section scanning electron microscope (SEM) images of the Prussian blue-like transition metal cyanide obtained in comparative example 1 (a) and example 1 (b) according to some embodiments of the present application.

The inventors have found through research that the particle size of the secondary particles is increased compared to the independently dispersed primary particles, and the primary particles in the secondary particles are in direct contact with each other in bulk phase, so the contact is closer. The curved surface provided by the spherical or spherical-like primary particles increases the contact surface between the each independently dispersed active material particles, reduces the porosity under compaction conditions, and improves the space utilization rate, as shown in FIG. 3. Therefore, high powder compacted density and the compacted density of an electrode plate can be obtained by using the Prussian blue-like transition metal cyanide of the present application, thus improving the mass energy density and volume energy density of secondary batteries. Moreover, the close contact between active material particles can improve the solid-phase transport performance of active ions, and the curved surfaces provided by primary particles also enable the close contact between active material particles and conductive agent particles (e.g. Super P etc.) to improve the electrical conductivity of the electrode plate, and thus the secondary battery can obtain higher energy density as well as improved rate performance.

In some embodiments, the secondary particles of the Prussian blue-like transition metal cyanide have an interior angle of 150°-300°, for example, 170°-270°, 180°-270°, 200°-270°, 210°-265°, 215°-250°, 215°-240°, or 200°-250°.

Figure 4:
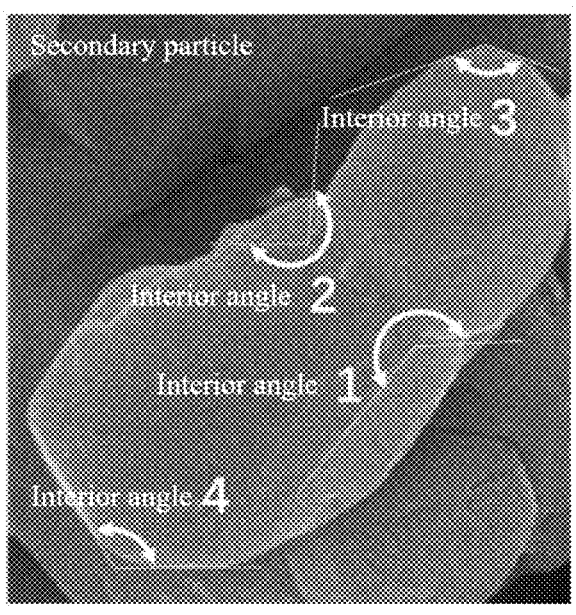
FIG. 4 is a schematic diagram of the interior angles of secondary particles according to some embodiments of the present application.

As shown in FIG. 4, the interior angle is the angle range of the inner side of the secondary particle surface, including the inner side angle of the primary particle surface that is not adjacent to other primary particles in the secondary particle and the inner side angle of the included angle formed by adjacent primary particles. An exemplary measurement method for the interior angle of secondary particles is as follows: a ZEISS Gemini SEM 300 Scanning Electron Microscope (SEM) is used in a backscattered electron mode at a magnification of 10 k to take pictures of 3 randomly different locations; randomly finding 2 secondary particles in each picture, the 2 secondary particle being composed of primary particles with a particle size greater than $D_v50$ of the Prussian blue-like transition metal cyanide; measuring the maximum interior angle of each secondary particle. Taking the average value of the measured values of the maximum interior angles of 6 secondary particles in the 3 pictures, that is the interior angle of the secondary particles.

For a Prussian blue-like transition metal cyanide with more obtuse angles on its particle surface, since its unit cell structure itself is a framework formed by longer coordination bonds, the particles thereof elasticity. Moreover, the obtuse angle of the particle surface will be more beneficial to increase the contact area between particles. Therefore, the use of the Prussian blue-like transition metal cyanide can improve the compacted density of an electrode plate and make the construction of conductive networks more unobstructed, thus improving the energy density and rate performance of a battery.

In some embodiments, in the secondary particles of the Prussian blue-like transition metal cyanide, the primary particles have a radius of curvature ≥0.2 μm. Within the scale of 100 microns, the larger the radius of curvature of the primary particle is, the closer it is to spherical morphology. Optionally, the primary particles of the Prussian blue-like transition metal cyanide have a radius of curvature of 0.2 μm-100 μm, 0.5 μm-100 μm, 0.8 μm-70 μm, 0.8 μm-50 μm, 0.8 μm-20 μm, 0.8 μm-15 μm, 0.8 μm-10 μm, 0.8 μm-8 μm, 0.8 μm-5 μm, 1.5 μm-50 μm, 1.5 μm-18 μm, 1.5 μm-12 μm, 1.5 μm-7 μm, 1 μm-70 μm, 2 μm-50 μm, 2 μm-20 μm, 5 μm-50 μm-30 μm, 3 μm-20 μm, 5 μm-20 μm, or 2 μm-10 μm.

The radius of curvature is fitted by a circle with a certain diameter, and then the radius of the fitted circle is the radius of curvature of the measured object. An exemplary measurement method for the radius of curvature of primary particles of the Prussian blue-like transition metal cyanide is as follows: a ZEISS Gemini SEM 300 Scanning Electron Microscope (SEM) is used in a backscattered electron mode at a magnification of 10 k to take pictures of 3 randomly different locations; 2 secondary particles are randomly found in each picture, the 2 secondary particle being composed of primary particles with a particle size greater than $D_v50$ of the Prussian blue-like transition metal cyanide; the radius of curvature is measured at any of the primary particles in the secondary particle; an average of the measured values of the radius of curvature of primary particles in the 6 secondary particles from the 3 pictures is taken as the radius of curvature of the primary particles.

An appropriate radius of curvature is beneficial to the close overlap between Prussian blue particles, which is conducive to the improvement of the compacted density of the electrode plate, and the smooth transfer of ions and electrons, thus improving the rate performance and energy density of a battery.

In some embodiments, the Prussian blue-like transition metal cyanide has a volume-average particle size $D_v50 \geq 1$ μm. Optionally, the $D_v50$ of the Prussian blue-like transition metal cyanide can be 1 μm-50 μm, 2 μm-50 μm, 2 μm-40 μm, 10 μm-40 μm, 5 μm-20 μm, 8 μm-25 μm, 5 μm-45 μm, 5 μm-30 μm, 5 μm-20 μm, 5 μm-15 μm, 4 μm-30 μm, 8 μm-20 μm, 1 μm-10 μm, or 2 μm-10 μm. An appropriate particle size range is beneficial to the increase of the compacted density of an electrode plate, and the ion and electron conduction is also faster, and therefore it is helpful to improve the energy density and rate performance of a battery.

In some embodiments, the Prussian blue-like transition metal cyanide has a powder compacted density of 1.7 g/cm³-2.1 g/cm³ under a pressure of 600 MPa. Optionally, the powder compacted density of the Prussian blue-like transition metal cyanide under a pressure of 600 MPa can be 1.8 g/cm³-2.1 g/cm³, 1.74 g/cm³-2.02 g/cm³, 1.8 g/cm³-1.95 g/cm³, 1.85 g/cm³-1.9 g/cm³, 1.71 g/cm³-1.9 g/cm³, or 1.71 g/cm³-1.85 g/cm³.

The Prussian blue-like transition metal cyanide has a high powder compacted density, which is beneficial to the contact between particles and the conductive agent, thus improving the rate performance of batteries. Moreover, the powder compacted density of the Prussian blue-like transition metal cyanide is also beneficial to improve the compacted density of an electrode plate, thus improving the energy density of a battery.

In some embodiments, the Prussian blue-like transition metal cyanide includes $A_xM^1[M^2(CN)_6]_y$, wherein A is selected from one or more of alkali metal ions and alkaline earth metal ions; $M^1$ is selected from one or more of Mn, Ni, Cu, Co, Fe, Zn, and Cr; $M^2$ is selected from one or more of Mn, Ni, Cu, Co, Fe, Zn, and Cr; $1.5 \leq x \leq 2$; and $0.6 \leq y \leq 1$. Therein x represents the content of A, and y represents the defect level of the Prussian blue-like transition metal cyanide. The greater the content of A, the less the defect level and the higher the capacity per gram of Prussian blue-like transition metal cyanide.

In some embodiments, A may be selected from one or more of Na, K, Zn and Li. As an example, A is selected as Na.

In some embodiments, $M^1$ is selected from one or more of Mn, Ni, Co and Fe. As an example, $M^1$ is selected as Mn.

In some embodiments, $M^2$ is selected from one or more of Mn, Ni, Co and Fe. As an example, $M^2$ is selected as Mn.

In some embodiments, $1.7 \leq x \leq 2$, $1.8 \leq x \leq 2$, or $1.9 \leq x \leq 2$.

In some embodiments, $0.8 \leq y \leq 1$, $0.9 \leq y \leq 1$, or $0.95 \leq y \leq 1$.

The higher values of x and y lead to lower valence states of the elements, and increased proportions of elements whose valence state can increase during charging, so the capacity per gram of the Prussian blue-like transition metal cyanide is increased, and thus the energy density of the battery can be improved.

In some embodiments, the Prussian blue-like transition metal cyanide has a powder resistivity of 10 kΩ·cm-100 kΩ·cm under a pressure of 12 MPa. Optionally, the powder resistivity of the Prussian blue-like transition metal cyanide under a pressure of 12 MPa is 10 kΩ·cm-90 kΩ·cm, 10 kΩ·cm-70 kΩ·cm, 20 kΩ·cm-90 kΩ·cm, 20 kΩ·cm-80 kΩ·cm, 30 kΩ·cm-80 kΩ·cm, 30 kΩ·cm-70 kΩ·cm, 20 kΩ·cm-60 kΩ·cm, or 40 kΩ·cm-60 kΩ·cm. Powder resistivity in an appropriate range indicates a close overlap between the Prussian blue-like transition metal cyanide particles, and facilitates an electrode plate with a higher ionic conductivity, thus improving the rate performance of a battery.

In some embodiments, the Prussian blue-like transition metal cyanide has a capacity per gram of 120 mAh/g-170 mAh/g. Optionally, the capacity per gram of the Prussian blue-like transition metal cyanide is 140 mAh/g-170 mAh/g, 145 mAh/g-165 mAh/g, 150 mAh/g-165 mAh/g, 155 mAh/g-165 mAh/g, or 155 mAh/g-160 mAh/g. As the Prussian blue-like transition metal cyanide has a large capacity per gram, it can increase the energy density of a battery.

In the present application, the volume-average particle size $D_v50$ of the Prussian blue-like transition metal cyanide has the meaning well known in the art, and can be measured by a method known in the art. For example, a laser diffraction particle size analysis method. For example, the measurement can be made with reference to the standard GB/T 19077.1-2016 using a laser particle size analyzer (e.g. Malvern Master Size 3000). In the measurement, the medium is, for example, water, and the absorbance is, for example, 1.567. $D_v50$ is the particle size such that the cumulative volume distribution percentage of the Prussian blue-like transition metal cyanide reaches 50%.

In the present application, the powder compacted density of the Prussian blue-like transition metal cyanide has the meaning well known in the art, and can be measured by a method known in the art. For example, the measurement can be made with reference to the standard GB/T 24533-2009 using an electronic pressure testing machine (e.g. model UTM7305). An exemplary measurement method is as follows: 1 g of a Prussian blue-like transition metal cyanide sample is weighed and added to a mold with a bottom area of $1.327 \text{ cm}^2$, pressure is increased to 600 MPa and maintained for 30 s, and then released and maintained for 10 s, and then the powder compacted density of the Prussian blue-like transition metal cyanide under a pressure of 600 MPa is recorded and calculated. Specifically, the height (H1) of the column that is exposed from the sleeve after pressurization can be measured using a vernier caliper, and the compacted density of the sample is calculated, $= m/(S \times (H1 - H0))$, wherein m: the mass of the sample;

H1: the height of the column that is exposed from the sleeve after the sample is compacted;

H0: the height of the column that is exposed from the sleeve when no sample is placed therein;

S: the cross-sectional area of the column.

In the present application, the chemical composition of the Prussian blue-like transition metal cyanide can be measured by methods known in the art. For example, an inductively coupled plasma spectrometer ICP (e.g., model Spectroblue) is used to measure the proportion of each element in a sample in the material.

In the present application, the powder resistivity of the Prussian blue-like transition metal cyanide has a meaning that is well known in the art, and can be measured by methods known in the art. For example, the measurement can be performed with reference to GB/T 30835-2014 using a PRCD 1100 powder resistivity meter.

In the present application, the capacity per gram of the Prussian blue-like transition metal cyanide has a meaning that is well known in the art, and can be measured by methods known in the art. An exemplary measurement method is as follows: uniformly mixing a prepared Prussian blue-like transition metal cyanide, a conductive agent (e.g., acetylene black (Denka, Denka Black)), a binder (e.g., polyvinylidene fluoride (Arkema, HSV 900)) at a mass ratio of 7:2:1 with a solvent N-methylpyrrolidone (NMP) to prepare a slurry; coating the prepared slurry onto an aluminum foil current collector, and drying same in an oven for later use. Using a sodium metal plate as a counter electrode, a ceramic separator and a propylene carbonate (PC) electrolyte solution composed of 1 mol/L $NaPF_6$ together in an argon-protected glove box to assemble a 2025 button battery. After standing the obtained button battery for 12 hours, charging same to 4 V at a constant current rate of 0.1 C by using a blue electrical tester at 25° C., and then charging same at a constant voltage until the current ≤0.05 C; after standing for 5 minutes, discharging same to 2 V at a constant current rate of 0.1 C, and recording the discharge capacity. The ratio of the discharge capacity to the mass of the Prussian blue-like transition metal cyanide is the capacity per gram of the prepared Prussian blue-like transition metal cyanide.

A second aspect of the present application provides a preparation method for a Prussian blue-like transition metal cyanide, and the above Prussian blue-like transition metal cyanide can be obtained according to the preparation method. The preparation method for the Prussian blue-like transition metal cyanide includes the following steps:

S1, providing a first solution comprising a transition metal cation, wherein the concentration of the transition metal cation in the first solution is ≥0.1 mol/L.

S2, providing a second solution comprising an A salt of transition metal cyanate, wherein the concentration of the transition metal cyanate anion in the second solution is ≥0.1 mol/L, and A is selected from one or more of alkali metal ions and alkaline earth metal ions.

S3, adding one of the first solution and the second solution to the other for mixing at a flow rate of 10 cm/s-100 m/s over 0.5 h-48 h while stirring, and a coprecipitation chemical reaction occurs to obtain a suspension; wherein the temperature of one of the solutions is 10° C.-40° C., and the temperature of the other is 40° C.-180° C.

S4, aging the suspension for ≥0.5 h while stirring at 40° C.-180° C.;

S5, separating, washing and drying same to obtain the Prussian blue-like transition metal cyanide; wherein the Prussian blue-like transition metal cyanide comprises secondary particles which comprise a plurality of primary particles, the primary particles having a spherical or spherical-like morphology.

In S1, the transition metal cation-providing species may be selected from one or more of transition metal chlorates, transition metal nitrates, transition metal sulfates, transition metal hydroxides, transition metal formates, transition metal acetates, transition metal oxalates, transition metal phosphates, transition metal phosphites, transition metal sulfites, transition metal thiosulfates, transition metal perchlorates, transition metal benzoates, and transition metal citrates. Optionally, the transition metal resource is selected from one or more of transition metal chlorates, transition metal nitrates and transition metal sulfates. Wherein the transition metal can be $M^1$. As a specific example, the transition metal cation-providing species may be selected from one or more of manganese chloride, manganese sulfate, manganese nitrate, nickel chloride, nickel sulfate, nickel nitrate, cobalt chloride, cobalt sulfate, and cobalt nitrate.

In some embodiments, the concentration of the transition metal cation in the first solution is 0.2 mol/L-4 mol/L. Optionally, the concentration of the transition metal cation in the first solution is 0.25 mol/L-3.5 mol/L, 0.3 mol/L-3 mol/L, 0.2 mol/L-2 mol/L, 0.35 mol/L-2 mol/L, or 0.4 mol/L-1 mol/L.

In S2, the transition metal in the transition metal cyanate may be $M^2$. For example, the transition metal cyanate may be selected from one or more of ferricyanate, manganese cyanate, cobalt cyanate, nickel cyanate, and copper cyanate. A can be a metal described herein. As an example, an A salt of the transition metal cyanate may be selected from one or more of sodium ferricyanide, potassium ferricyanide, sodium ferrocyanide, lithium ferrocyanide, sodium nickel cyanide, zinc cobalt cyanide, and potassium cobalt cyanide.

In some embodiments, the concentration of the transition metal cyanate anion in the second solution is 0.2 mol/L-4 mol/L. Optionally, the concentration of the transition metal cyanate anion in the second solution is 0.25 mol/L-3.5 mol/L, 0.3 mol/L-3 mol/L, 0.2 mol/L-2 mol/L, 0.35 mol/L-2 mol/L, or 0.4 mol/L-1 mol/L.

The solvent of the first solution and the second solution may be independently selected from one or more of water, heavy water, acetonitrile, adiponitrile, methanol, ethanol, ethylene glycol, diethylene glycol, acetone, glycerol, dimethylformamide and N-methylpyrrolidone. For example, the solvent of the first solution and the second solution may be selected from water, e.g., deionized water.

If the concentrations of the transition metal cation and the transition metal cyanate anion are high, the yield of the Prussian blue-like transition metal cyanide can be improved and the production cost can be reduced. Especially when the concentrations of the transition metal cation in the first solution and the transition metal cyanate anion in the second solution are in an appropriate range, such that the concentration of the crystal generated by the reaction is thermodynamically lower than the saturation solubility, and they are in liquid phase to maintain a stable concentration for reaction, so as to obtain the Prussian blue-like transition metal cyanide of the present application.

In some embodiments, the first solution or the second solution also optionally comprises an A source. The A source is selected from one or more of A chlorate, A nitrate, A sulfate, A hydroxide, A formate, A acetate, A oxalate, A phosphate, A perchlorate, A benzoate, and A citrate. optionally, the A source is selected from one or more of A chlorate, A nitrate and A sulfate.

In some embodiments, the concentration of the A source added to the first solution or the second solution is 0.05 mol/L-10 mol/L; optionally 0.05 mol/L-5 mol/L, 1 mol/L-5 mol/L, 3 mol/L-8 mol/L, 2 mol/L-6 mol/L, 4 mol/L-9 mol/L, or 4 mol/L-7 mol/L.

The addition of the A source can accelerate the mobility of A towards the framework of the Prussian blue-like transition metal cyanide, which is beneficial to the structural integrity of the product, and thus can improve the capacity per gram of the Prussian blue-like transition metal cyanide, so as to improve the energy density of a battery.

In some embodiments, the first solution or the second solution comprises an antioxidant. As an example, the antioxidant may be selected from ascorbic acid, sodium ascorbate, thiosulfuric acid, sodium thiosulfate, citric acid or sodium citrate. The antioxidant can inhibit the transition metal from oxidizing in the reaction solution and reduce the probability that the products are doped with oxide impurities, and thus can improve the capacity per gram of the Prussian blue-like transition metal cyanide, so as to improve the energy density of a battery.

In S3, any device and method can be used to adjust and control the flow rate and the time for adding one of the first solution and the second solution into the other. As an example, a syringe with a diameter of 0.3 mm-2 mm, a peristaltic pump or an autosampler can be used. The solution mixing under the conditions of specific flow rate and time is carried out by calculating the relationship between the mixing time, the flow rate and the diameter of the sample introduction tube.

The sequence of mixing the solutions will affect the physical properties of the product; for example, compared with adding the second solution to the first solution, adding the first solution to the second solution leads to a lower interior angle of the obtained secondary particles, but an increased radius of curvature of the primary particles and increased $D_v50$ of the material, as well as an increased powder resistivity.

In some embodiments, the flow rate for the mixing in S3 is 10 cm/s-20 m/s. Optionally, the flow rate for mixing in S3 is 50 cm/s-20 m/s, 10 cm/s-10 m/s, 50 cm/s-10 m/s, 50 cm/s-5 m/s, 1 m/s-8 m/s, 1 m/s-5 m/s, 2 m/s-5 m/s, or 50 cm/s-2 m/s. Within an appropriate flow rate range, the transition metal cations or the transition metal cyanate anions added to the solution can form a certain local concentration in the mixed solution. At the mixing interface, the concentration of the transition metal cations or the transition metal cyanate anions in the added solution and the solution to be added exceeds the saturability of the Prussian blue-like transition metal cyanide and the degree of supersaturation is relatively high, and therefore, the nucleation tends to occur. At the moment when nucleation occurs, the crystal nuclei are quickly dispersed in the mixed solution by using a fast flow rate, which improves the dispersity of the final particles, such that the particles are not easy to excessively aggregate but not be excessively dispersed, and the primary particles can form secondary particles in a spherical state. Therefore, the obtained Prussian blue-like transition metal cyanide has suitable particle size distribution and morphology, which is beneficial to improve the compacted density of an electrode plate and reduce the resistivity of the electrode plate, and therefore is helpful to improve the energy density of a battery.

In some embodiments, the mixing in S3 lasts 1 h-24 h. Optionally, the mixing in S3 lasts 4 h-20 h, 6 h-12 h, 2 h-12 h, 0.5 h-10 h, 5 h-15 h, 8 h-24 h, 10 h-48 h, or 1 h-4 h. Within an appropriate mixing time range, the grains can further grow in a supersaturated state to obtain a larger particle size, thus reducing the resistivity of the electrode plate to improve the capacity per gram of the battery, and increase the compacted density of the electrode plate and the energy density of a battery.

In some embodiments, the temperature of the other solution in S3 is 60° C.-140° C. Optionally, the temperature of the other solution in S3 is 60° C.-120° C., 70° C.-110° C., or 80° C.-100° C. The content of metal A and transition metal M2 in the chemical formula of the product can be increased by controlling the temperature of the solution, making the crystal structure more integral with fewer defects, such that the Prussian blue-like transition metal cyanide will exhibit high capacity per gram and the energy density of a battery can be improved.

In some embodiments, the temperature for the aging in S4 is 60° C.-140° C. Optionally, the temperature for the aging in S4 is 60° C.-120° C., 70° C.-110° C., or 80° C.-100° C.

In some embodiments, in S4, the aging lasts 1 h-24 h. Optionally, in S4, the aging lasts 2 h-12 h, 5 h-15 h, 8 h-20 h, 10 h-15 h, or 6 h-12 h.

Within an appropriate range of temperature for the aging and aging time, the precipitation product can be reformed, so that more elemental Na goes into the structure of the Prussian blue-like transition metal cyanide and the proportion of Na in the product is increased, thus increasing the capacity per gram of the Prussian blue-like transition metal cyanide and the energy density of a battery.

The separating, washing and drying in S5 can be performed by any means well known in the art. As an example, a suction filtration method can be used to separate the Prussian blue-like transition metal cyanide from the reaction solution. The washing may be washing the product of the Prussian blue-like transition metal cyanide with deionized water for 3-5 times, followed by anhydrous ethanol for 1-5 times. The drying can be done in a vacuum drying oven at 120° C.-180° C. for 12-48 hours.

Figure 5:
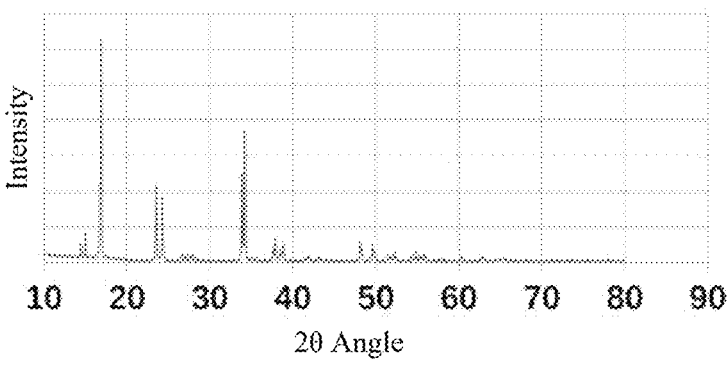
FIG. 5 is an X-ray diffraction (XRD) image of the Prussian blue-like transition metal cyanide obtained in example 1, and the result shows that the material is in a typical monoclinic phase according to some embodiments of the present application.

The successfully synthesized Prussian blue-like transition metal cyanide is in a typical monoclinic phase, as shown in FIG. 5.

A third aspect of the present application provides a positive electrode plate comprising a positive electrode material, wherein the positive electrode material includes any one or more of the Prussian blue-like transition metal cyanides according to the present application.

Due to the use of the positive electrode material of the present application, the positive electrode plate of the present application can make the sodium ion battery using it have high energy density. Further, the sodium ion battery can also have higher rate performance.

The positive electrode plate of the present application comprises a positive electrode current collector and a positive film layer which is provided on at least one surface of the positive electrode current collector and comprises a positive electrode material. In an exemplary positive electrode plate, the positive electrode current collector has two opposite surfaces on its thickness direction, and the positive film layer may be laminated and disposed on either or both of the two opposite surfaces of the positive electrode current collector.

In the positive electrode plate of the disclosure, a metal foil or a composite current collector can be used as the positive electrode current collector. For example, an aluminum foil can be used. The composite current collector can be formed by forming a metal material (aluminum, aluminum alloys, nickel, nickel alloys, titanium, titanium alloys, silver and silver alloys, etc.) on a polymer substrate.

In the positive electrode plate of the present application, the positive film layer includes a positive electrode material, and the positive electrode material includes any one or more of Prussian blue-like transition metal cyanides of the present application.

In some embodiments, the positive electrode material can also include other positive electrode active materials for the positive electrode of sodium ion batteries. Examples of other positive electrode active materials may include layered metal oxides such as $Na_{0.9}Fe_{0.5}Mn_{0.5}O_2$, $NaMnO_2$, $NaFeO_2$, $NaCoO_2$, and $NaFe_{0.33}Mn_{0.33}Ni_{0.33}O_2$, and polyanionic positive electrode material such as $Na_3V_2(PO_4)_3$, $NaFePO_4$, $Na_4Fe_3(PO_4)_2P_2O_7$.

In the secondary battery of the present application, the positive film layer generally comprises a positive electrode material and optionally a binder and optionally a conductive agent, and is usually formed by coating, drying and cold pressing the positive electrode slurry. The positive electrode slurry is usually formed by dispersing the positive electrode active material and optionally a conductive agent and a binder in a solvent and uniformly stirring same. The solvent may be N-methylpyrrolidone (NMP).

The binder in the positive film layer can be binders for an positive electrode known in the art. An an example, binder for the positive film layer may include one or more of polyvinylidene fluoride (PVDF), polytetrafluoroethylene (PTFE), and acrylonitrile multipolymer (LA133).

In some embodiments, the mass percentage of the binder in the positive film layer is 1%-20%; optionally 1%-10%, 2%-5%, 2%-12%, 3%-8%, 5%-10%, 5%-15%, or 10%-20%, etc. In the present application, the particle size of the Prussian blue-like transition metal cyanide is increased, which can improve the processing performance of the positive electrode slurry, and can also make the electrode plate obtain higher bonding force while reducing the amount of a binder, thus further improving the energy density of secondary batteries.

The conductive agent in the positive film layer can be conductive agents for a positive electrode known in the art. As an example, the conductive agent for the positive film layer may comprise one or more of superconducting carbon, carbon black (e.g., Super P, acetylene black, Ketjen black), carbon dots, carbon nanotubes, graphene, and carbon nanofibers.

In some embodiments, the mass percentage of the conductive agent in the positive film layer is 1%-20%; optionally 1%-10%, 2%-5%, 2%-12%, 3%-8%, 5%-10%, 5%-15%, or 10%-20%, etc. In the present application, the Prussian blue-like transition metal cyanide particles can be brought into close contact with the conductive agent, which also enables the electrode plate to obtain higher electrical conductivity while reducing the amount of the conductive agent, thus improving the rate performance and energy density of a secondary battery.

In some embodiments, the compacted density of the positive film layer is 1.2-1.6 $g/cm^3$; for example, it may be 1.25-1.55 $g/cm^3$, 1.3-1.5 $g/cm^3$, or 1.35-1.45 $g/cm^3$. The positive film layer has a high compacted density, which can improve the energy density of a battery.

The compacted density of the positive film layer has a meaning that is well known in the art, and can be measured by methods known in the art. For example, a positive electrode plate that is coated on one side and cold pressed (if it is coated on both sides, the positive film layer on one side can be wiped away first) is taken, the thickness of the positive film layer is measured, and the areal density of the positive film layer is measured according to the method below; the compacted density of the positive film layer=the areal density of the positive film layer/the thickness of the positive film layer.

The areal density of the positive film layer has a meaning that is well known in the art, and can be measured by methods known in the art. For example, a positive electrode plate that is coated on one side and cold pressed (if it is coated on both sides, the positive film layer on one side can be wiped away first) is taken and punched into a small wafer with an area of S1, which is weighted and the weight is recorded as M1. Then the positive film layer of the above positive electrode plate after weighing is wiped away, the positive electrode current collector is weighed and the weight is recorded as M0; the areal density of the positive film layer=(the weight of the positive electrode plate M1—the weight of the positive electrode current collector M0)/S1.

A fourth aspect of the present application provides a secondary battery comprising a positive electrode plate, wherein the positive electrode plate is any positive electrode plate of the present application.

The secondary batteries of the present application can be classified into different types of secondary batteries according to different active ions (A), for example sodium ion battery, magnesium ion battery, potassium ion battery, zinc ion battery, lithium ion battery, etc.

Due to the use of the positive electrode plate of the present application, the secondary battery of the present application can have higher energy density.

The secondary battery of the present application can also comprise a negative electrode plate and an electrolyte. During charging and discharging of the battery, active ions move back and forth and intercalated and de-intercalated between the positive electrode plate and the negative electrode plate. The electrolyte conducts ions between the positive electrode plate and the negative electrode plate.

In the secondary battery of the present application, the negative electrode plate comprises a negative electrode current collector and a negative film layer provided on at least one surface of the negative electrode current collector.

In the secondary battery of the present application, a metal foil or a composite current collector can be used as the negative electrode current collector. For example, an aluminum foil or a copper foil can be used. The composite current collector can be formed by forming a metal material (aluminum, aluminum alloys, copper, copper alloys, nickel, nickel alloys, titanium, titanium alloys, silver and silver alloys, etc.) on a polymer substrate.

The negative film layer comprises a negative electrode material. A negative electrode material known in the art that can be used in a secondary battery can be used in the secondary battery of the present application. As an example, the negative electrode material may include one or more of natural graphite, artificial graphite, soft carbon, hard carbon, silicon-based materials, and tin-based materials. The silicon-based material may be selected from one or more of elemental silicon, silicon oxides, and silicon carbon composites. The tin-based material may be selected from one or more of elemental tin, tin oxides, and tin alloys.

In the secondary battery of the present application, the negative film layer generally comprises a negative electrode material and an optional binder, an optional conductive agent and other optional auxiliary agents, and is usually formed by coating and drying the negative electrode slurry. The negative electrode slurry is usually formed by dispersing the negative electrode active material and optionally a conductive agent and a binder in a solvent and uniformly stirring same. The solvent can be N-methylpyrrolidone (NMP) or deionized water.

An an example, the conductive agent may include one of more of superconducting carbon, carbon black (e.g., Super P, acetylene black, Ketjen black), carbon dots, carbon nanotubes, graphene, and carbon nanofibers.

An an example, the binder may include one or more of butadiene styrene rubber (SBR), polyvinylidene fluoride, and acrylonitrile multipolymer.

Other optional auxiliaries are for example thickening agents (e.g. sodium carboxymethyl cellulose CMC-Na), PTC thermistor materials, etc.

There is no specific limitation on the type of electrolyte in the secondary battery of the present application, and it can be selected according to the requirement. For example, the electrolyte may be selected from at least one of solid electrolyte and liquid electrolyte (i.e., electrolyte solution).

In some embodiments, an electrolyte solution is used as the electrolyte. The electrolyte solution comprises an electrolyte salt and a solvent.

In some embodiments, the electrolyte salt may be selected from one or more of $NaPF_6$, $NaClO_4$, $NaBF_4$, $KPF_6$, $KClO_4$, $KBF_4$, $LiPF_6$, $LiClO_4$, $LiBF_4$, $Zn(PF_6)_2$, $Zn(ClO_4)_2$, and $Zn(BF_4)_2$. For example, the electrolyte salt may be selected from one or more of $NaPF_6$, $NaClO_4$, and $NaBF_4$.

In some embodiments, the solvent may be selected from one or more of propylene carbonate (PC), ethylene carbonate (EC), diethyl carbonate (DEC), dimethyl carbonate (DMC), and ethyl acetate (EA).

In some embodiments, the electrolyte solution may optionally comprise an additive. For example, the additives may include negative electrode film-forming additives, positive electrode film-forming additives, and additives that can improve some performances of the battery, such as additives that improve overcharge performance of the battery, additives that improve high-temperature performance of the battery, and additives that improve low-temperature performance of the battery.

In some embodiments, the secondary battery of the present application further comprises a separator. The separator is disposed between the positive electrode plate and the negative electrode plate to play a role of isolation. The separator is not particularly limited, and any well-known porous structure separator having electrochemical stability and mechanical stability can be selected. For example, the separator may be selected from a single-layer film or a multi-layer composite film of one or more of glass fiber, non-woven fabric, polyethylene, polypropylene and polyvinylidene fluoride.

In some embodiments, the positive electrode plate, the negative electrode plate and the separator may be wound or laminated to form an electrode assembly.

In some embodiments, the secondary battery may comprise an outer package. The outer package may be a hard case, for example, a hard plastic case, an aluminum case, a steel case, etc. The outer package may also be a soft pack, such as a pouch type soft pack. The soft bag may be made from plastic, such as polypropylene (PP), polybutylene terephthalate (PBT), polybutylene succinate (PBS) or combination thereof.

Figure 6:
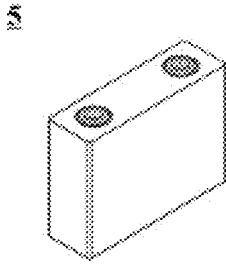
FIG. 6 is a schematic diagram of an embodiment of the secondary battery according to some embodiments of the present application.

The shape of the secondary battery is not limited in this application, and may be cylindrical, square or of any other shape. FIG. 6 shows a secondary battery 5 with a square structure as an example.

Figure 7:
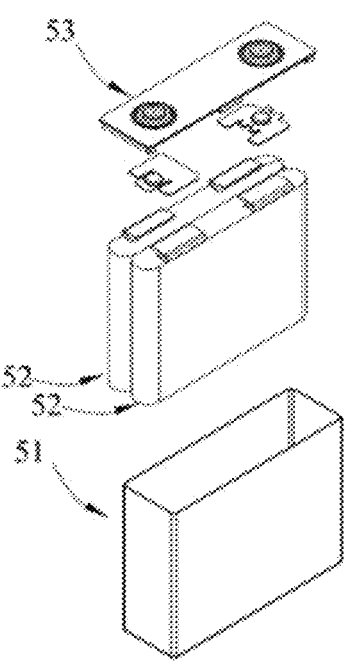
FIG. 7 is an exploded view of FIG. 6 according to some embodiments of the present application.

In some embodiments, referring to FIG. 7, the outer package may comprise a housing 51 and a cover plate 53. In an example, the housing 51 may include a bottom plate and a side plate connected to the bottom plate, and the bottom plate and the side plate are combined to form an accommodating cavity. The housing 51 has an opening communicating with the accommodating cavity, and the cover plate 53 can cover the opening to close the accommodating cavity. The positive electrode plate, the negative electrode plate and the separator may be wound or laminated to form an electrode assembly 52. The electrode assembly 52 is encapsulated in the accommodating cavity. The electrolyte solution infiltrates the electrode assembly 52. The number of the electrode assemblies 52 included in the secondary battery 5 may be one or more, and may be adjusted according to different needs.

A fifth aspect of the present application provides a battery module comprising the secondary battery according to the fourth aspect of the present application. In some embodiments, the secondary battery can be further assembled into a battery module, a plurality of secondary batteries can be included in the battery module, and the specific number of the secondary batteries can be adjusted according to the application and desirable capacity of the battery module.

Figure 8:
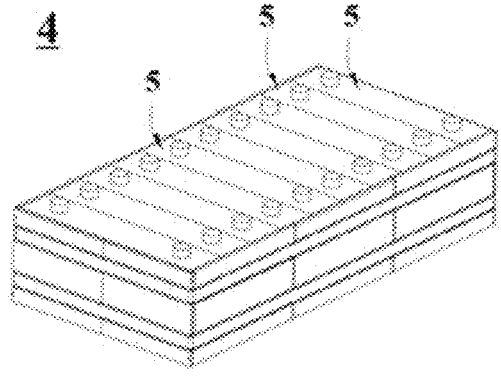
FIG. 8 is a schematic diagram of an embodiment of the battery module according to some embodiments of the present application.

FIG. 8 shows a battery module 4 as an example. Referring to FIG. 8, in the battery module 4, a plurality of secondary batteries 5 may be disposed sequentially in the length direction of the battery module 4. Apparently, the secondary batteries may also be disposed in any other manner. Further, a plurality of secondary batteries 5 can be fixed by a fastener.

Optionally, the battery module 4 may comprise a housing with a receiving space, and the plurality of secondary batteries 5 are received in the receiving space.

A sixth aspect of the present application provides a battery pack comprising the secondary battery according to the fourth aspect of the present application or the battery module according to the fifth aspect of the present application. In some embodiments, the battery module may be further assembled into a battery pack, and a quantity of battery modules included in the battery pack may be adjusted based on application and capacity of the battery pack.

Figure 9:
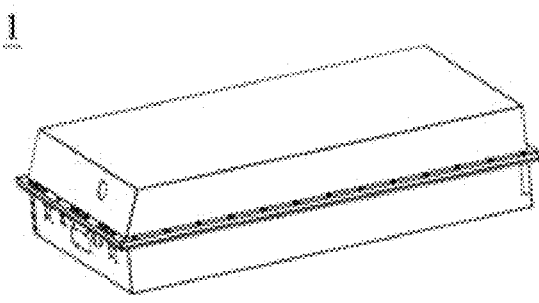
FIG. 9 is a schematic diagram of an embodiment of the battery pack according to some embodiments of the present application.
Figure 10:
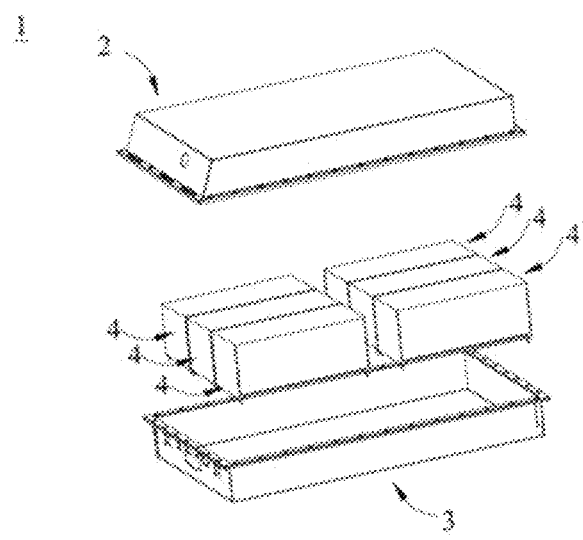
FIG. 10 is an exploded view of FIG. 9 according to some embodiments of the present application.

FIGS. 9 and 10 are a battery pack 1 as an example. With reference to FIG. 9 and FIG. 10, the battery pack 1 may include a battery case and a plurality of battery modules 4 provided in the battery case. The battery case comprises an upper case body 2 and a lower case body 3. The upper case body 2 can cover the lower case body 3 to form a closed space for receiving the battery modules 4. A plurality of battery modules 4 can be disposed in the battery case in any manner.

A seventh aspect of the present application provides a device comprising at least one of the secondary battery according to the fourth aspect of the present application, the battery module according to the fifth aspect of the present application, or the battery pack according to the sixth aspect of the present application. The secondary battery can be used as a power supply of the apparatus or as an energy storage unit of the apparatus. The apparatus of the present application uses the secondary battery provided by the present application, and thus has at least the same advantages as the secondary battery.

The device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like.

The apparatus may comprise the secondary battery, the battery module or the battery pack selected according to its usage requirements.

Figure 11:
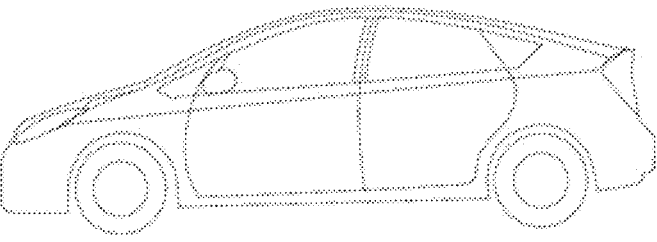
FIG. 11 is a schematic diagram of an embodiment of the device using the secondary battery as the power source according to some embodiments of the present application.

FIG. 11 shows an apparatus as an example. The device may be battery electric vehicle, a hybrid electric vehicle, a plug-in hybrid electric vehicle, or the like. In order to meet the requirements of the apparatus for high power and high energy density of secondary batteries, the battery pack or battery module can be used.

In another example, the apparatus may be a mobile phone, a tablet computer, a notebook computer, or the like. The apparatus is generally required to be thin and light, and the secondary battery can be used as a power supply.

EXAMPLES

In order to make the purpose of the application, technical solutions, and beneficial technical effects of the present application clearer, the following further describes the present application in detail with reference to embodiments. However, it should be understood that the embodiments of the application are only for explaining the application, not for limiting the application, and the embodiments of the application are not limited to the embodiments given in the specification. The specific experimental conditions or operating conditions that are not specified in the examples are manufactured under conventional conditions, or manufactured under the conditions recommended by the material supplier.

Example 1

S1, 6.292 g of manganese chloride, 35 g of sodium chloride, and 2.48 g of sodium thiosulfate (an antioxidant) are dispersed into 100 mL of deionized water at 25° C. to obtain a first solution.

S2, 19.203 g of sodium ferrocyanide is dispersed into 100 mL of deionized water at 25° C. to obtain a second solution.

S3, the first solution is heated to 80° C., and then the second solution at 25° C. is injected into the first solution by means of a syringe with an internal diameter of 0.6 mm at a flow rate of 2 m/s over 10 h while stirring at a speed of 800 rpm/min, so that a coprecipitation chemical reaction occurs. The needle of the syringe is inserted below the liquid level to ensure the mixing effect.

S4, the obtained suspension is maintained at 80° C. and aged for 24 hours while stirring, so that small crystal grains are dissolved and large crystal grains grow continuously.

S5, a white spherical-like Prussian blue-like transition metal cyanide material $Na_2Mn[Fe(CN)_6]$ is obtained after suction filtration, washing with water, washing with ethanol and drying.

Examples 2 and 11

They are similar to Example 1, except that the antioxidant in the first solution is 1 g of ascorbic acid, see Table 1 for other parameters.

Example 3

It is similar to Example 1, except that the antioxidant in the first solution is 0.5 g of ascorbic acid, see Table 1 for other parameters.

Example 4

It is similar to Example 1, except that the antioxidant in the first solution is 1 g of sodium ascorbate, see Table 1 for other parameters.

Example 5

It is similar to Example 1, except that the antioxidant in the first solution is 2 g of ascorbic acid, see Table 1 for other parameters.

Example 6

It is similar to Example 1, except that the antioxidant in the first solution is 0.5 g of ascorbic acid, see Table 1 for other parameters.

Example 7

It is similar to Example 1, except that the antioxidant in the first solution is 0.1 g of sodium ascorbate and 0.48 g of sodium thiosulfate, see Table 1 for other parameters.

Example 8

It is similar to Example 1, except that the antioxidant in the first solution is 0.1 g of ascorbic acid and 0.48 g of sodium thiosulfate, see Table 1 for other parameters.

Examples 9-10

They are similar to Example 1, except that the antioxidant in the first solution is 0.2 g of ascorbic acid, see Table 1 for other parameters.

Example 12

It is similar to Example 1, except that the antioxidant in the first solution is 0.5 g of ascorbic acid; and in S3, the second solution is heated to 80° C., and then the first solution at 25° C. is injected into the second solution by using a syringe with an internal diameter of 0.6 mm; see Table 1 for other parameters.

Example 13

It is similar to Example 1, except that the antioxidant in the first solution is 0.5 g of ascorbic acid, the first solution is heated to 95° C. and the diameter of the syringe is 0.4 mm, see Table 1 for other parameters.

Example 14

It is similar to Example 13, except that the antioxidant in the first solution is 0.3 g of ascorbic acid and 0.48 g of sodium thiosulfate, see Table 1 for other parameters.

Example 15

It is similar to Example 13, except that the antioxidant in the first solution is 1 g of sodium ascorbate, see Table 1 for other parameters.

Examples 16-17

They are similar to Example 13, except that the antioxidant in the first solution is 1 g of ascorbic acid, see Table 1 for other parameters.

Examples 18-21 and Comparative Examples 1-6 and 8

They are similar to Example 1, see Table 1 for different parameters.

Comparative Example 7

It is similar to Example 13, see Table 1 for different parameters.

Test Section (1) Flow rate for mixing (m/s): a high-speed camera (CCD) is used to determine the ejection speed of the fluid at the outlet of the syringe.

(2) Mixing time (h): the time from when the syringe begins to inject the liquid to the end of the injection.

(3) Temperature of heated solution (° C.): measurement is made by inserting a thermocouple to the bottom of the solution.

(4) Aging time (h): Timing is started when the syringe finishes injecting the liquid.

(5) Energy density (Wh/kg):

S1, the positive electrode material (the Prussian blue transition metal cyanide) of each example or comparative example, a conductive agent of acetylene black (Denka, Denka Black), and a binder of polyvinylidene fluoride (Arkema, HSV 900) are dispersed at a weight ratio of 90:5:5 in a solvent of N-methylpyrrolidone, thoroughly stirred and uniformly mixed to obtain a positive electrode slurry with a solid content of 30%. The positive electrode slurry is coated onto both sides of an aluminum foil with a thickness of 12 μm using a scraper to form wet coatings each having a thickness of 120 The aluminum foil is transferred into an oven and dried at 150° C. for 60 minutes, a cold press machine is used for cold pressing at a pressure of 60 tons, so as to obtain a positive electrode plate in which the two sides of the aluminum foil each has a positive film layer with a thickness of 130 μm and a compacted density of 1.3 g/cm$^3$.

S2, a negative electrode material of hard carbon, a conductive agent of acetylene black, a binder of butadiene styrene rubber and a thickening agent of sodium carboxymethyl cellulose are dispersed at a weight ratio of 95:2:2:1 in a solvent of deionized water, and thoroughly stirred and uniformly mixed to obtain a negative electrode slurry with a solid content of 15%; the negative electrode slurry is coated onto the two sides of an aluminum foil with a thickness of 12 μm by using a scraper, so as to form wet coatings each having a thickness of 120 μm. The aluminum foil is transferred into an oven and dried at 150° C. for 60 minutes, a cold press machine is used for cold pressing at a pressure of 50 tons, so as to obtain a negative electrode plate in which the two sides of the aluminum foil respectively having a negative film layer with a thickness of 60 μm and a compacted density of 0.95 g/cm$^3$.

S3, the positive electrode plate, a separator, and the negative electrode plate are wound in sequence to form a bare cell having a wound stacked structure of 16 cm×10 cm×2.8 cm in size. The bare cell is placed in a steel case as outer package, 150 g of electrolyte solution is injected into the steel case, and a secondary battery can be obtained after packaging. The electrolyte solution is a solution of 1 mol/L $NaPF_6$ in propylene carbonate (PC). At 25° C., the battery is charged at a constant current rate of 0.1 C to the rated voltage of 4.0 V and charged at a constant voltage for 30 minutes, and then discharged to 1.5 V at a constant current rate of 0.1 C. The energy released during the constant-current discharging is recorded and divided by the overall mass of the battery to obtain the energy density of the battery.

(6) Rate performance (%):

At 25° C., the battery is charged at a constant current rate of 0.1 C to the nominal voltage of 4.0 V and charged at a constant voltage for 30 minutes, and then discharged to 1.5 V at a constant current rate of 0.1 C, and the capacity C1 released during constant-current discharging is recorded.

At 25° C., the battery is charged at a constant current rate of 0.1 C to the nominal voltage of 4.0 V and charged at a constant voltage for 30 minutes, and then discharged to 1.5 V at a constant current rate of 1 C, and the capacity C2 released during constant-current discharging is recorded.

C2 divided by C1 and multiplied by 100% is the rate performance of the battery.

TABLE 1

| | | | | Preparation process for Prussian blue-like transition metal cyanide | | | |
|---|---|---|---|---|---|---|---|
| No. | Raw materials | Flow rate for mixing (m/s) | Mixing time (h) | Concentration of transition metal cation (mol/L) | Concentration of transition metal cyanate anion (mol/L) | Temperature of heated solution (° C.) | Aging time (h) |
| Example 1 | $MnCl_2$, $Na_4Fe(CN)_6$ | 2 | 10 | 0.5 | 0.5 | 80 | 12 |
| Example 2 | $MnCl_2$, $Na_4Fe(CN)_6$ | 0.1 | 10 | 0.5 | 0.5 | 80 | 12 |
| Example 3 | $MnCl_2$, $Na_4Fe(CN)_6$ | 0.5 | 10 | 0.5 | 0.5 | 80 | 12 |
| Example 4 | $MnCl_2$, $Na_4Fe(CN)_6$ | 20 | 10 | 0.5 | 0.5 | 80 | 12 |
| Example 5 | $MnCl_2$, $Na_4Fe(CN)_6$ | 100 | 10 | 0.5 | 0.5 | 80 | 12 |
| Example 6 | $MnCl_2$, $Na_4Fe(CN)_6$ | 2 | 2 | 0.5 | 0.5 | 80 | 12 |
| Example 7 | $MnCl_2$, $Na_4Fe(CN)_6$ | 2 | 0.5 | 0.5 | 0.5 | 80 | 12 |
| Example 8 | $MnCl_2$, $Na_4Fe(CN)_6$ | 2 | 48 | 0.5 | 0.5 | 80 | 12 |
| Example 9 | $MnCl_2$, $Na_4Fe(CN)_6$ | 2 | 10 | 2 | 0.2 | 80 | 12 |
| Example 10 | $MnCl_2$, $Na_4Fe(CN)_6$ | 2 | 10 | 0.2 | 2 | 80 | 12 |
| Example 11 | $MnCl_2$, $Na_4Fe(CN)_6$ | 2 | 10 | 0.5 | 0.5 | 180 | 12 |
| Example 12 | $MnCl_2$, $Na_4Fe(CN)_6$ | 2 | 10 | 0.5 | 0.5 | 80 | 12 |
| Example 13 | $NiSO_4$, $Na_4Co(CN)_6$ | 2 | 10 | 0.5 | 0.5 | 80 | 12 |
| Example 14 | $NiSO_4$, $Na_4Co(CN)_6$ | 5 | 10 | 0.5 | 0.5 | 80 | 12 |
| Example 15 | $NiSO_4$, $Na_4Co(CN)_6$ | 2 | 2 | 0.5 | 0.5 | 80 | 12 |
| Example 16 | $NiSO_4$, $Na_4Co(CN)_6$ | 2 | 10 | 2 | 0.2 | 80 | 12 |
| Example 17 | $NiSO_4$, $Na_4Co(CN)_6$ | 2 | 10 | 0.2 | 2 | 80 | 12 |
| Example 18 | $MnCl_2$, $Na_4Fe(CN)_6$ | 2 | 10 | 0.5 | 0.5 | 80 | 0.5 |
| Example 19 | $MnCl_2$, $Na_4Fe(CN)_6$ | 2 | 10 | 0.5 | 0.5 | 80 | 1 |
| Example 20 | $MnCl_2$, $Na_4Fe(CN)_6$ | 2 | 10 | 0.5 | 0.5 | 80 | 24 |
| Example 21 | $MnCl_2$, $Na_4Fe(CN)_6$ | 2 | 10 | 0.5 | 0.5 | 80 | 48 |
| Comparative example 1 | $MnCl_2$, $Na_4Fe(CN)_6$ | 0.001 | 10 | 0.5 | 0.5 | 80 | 12 |
| Comparative example 2 | $MnCl_2$, $Na_4Fe(CN)_6$ | Direct mixing | 10 | 0.5 | 0.5 | 80 | 12 |
| Comparative example 3 | $MnCl_2$, $Na_4Fe(CN)_6$ | 2 | 0.1 | 0.5 | 0.5 | 80 | 12 |
| Comparative example 4 | $MnCl_2$, $Na_4Fe(CN)_6$ | 2 | 96 | 0.5 | 0.5 | 80 | 12 |
| Comparative example 5 | $MnCl_2$, $Na_4Fe(CN)_6$ | 2 | 10 | 0.01 | 0.01 | 80 | 12 |
| Comparative example 6 | $MnCl_2$, $Na_4Fe(CN)_6$ | 2 | 10 | 0.5 | 0.5 | 10 | 12 |
| Comparative example 7 | $NiSO_4$, $Na_4Co(CN)_6$ | Direct mixing | 10 | 0.5 | 0.5 | 80 | 12 |
| Comparative example 8 | $MnCl_2$, $Na_4Fe(CN)_6$ | 2 | 10 | 0.5 | 0.5 | 80 | 0.1 |

In table 1, the temperature of the heated solution means that when one of the first solution and the second solution is added into the other for mixing, the other solution will be heated, and the temperature of this solution is the temperature of the heated solution.

TABLE 2

| | | | | | Radius of curvature of | | | | |
| No. | Chemical formula of product | Main particle type | Interior angle of secondary particles (°) | Morphology of primary particles | primary particles (μm) | $D_v50$ (μm) | Powder compaction density (g/cm³) | Powder resistivity (kΩ · cm) |
|---|---|---|---|---|---|---|---|---|
| Example 1 | $Na_2Mn[Fe(CN)_6]$ | Secondary particle | 235 | Spherical | 3 | 10 | 1.88 | 20 |
| Example 2 | $Na_{1.82}Mn[Fe(CN)_6]_{0.96}$ | Secondary particle | 224 | Spherical | 2 | 8 | 1.81 | 12 |
| Example 3 | $Na_{1.89}Mn[Fe(CN)_6]_{0.97}$ | Secondary particle | 226 | Spherical | 3 | 10 | 1.81 | 20 |
| Example 4 | $Na_{1.99}Mn[Fe(CN)_6]_{0.99}$ | Secondary particle | 235 | Spherical | 6.5 | 45 | 1.87 | 40 |
| Example 5 | $Na_{1.98}Mn[Fe(CN)_6]_{0.99}$ | Secondary particle | 264 | Spherical | 6 | 35 | 1.87 | 15 |
| Example 6 | $Na_{1.95}Mn[Fe(CN)_6]_{0.99}$ | Secondary particle | 223 | Spherical | 4.5 | 30 | 1.72 | 50 |
| Example 7 | $Na_{1.8}Mn[Fe(CN)_6]_{0.95}$ | Secondary particle | 173 | Spherical | 70 | 24 | 1.92 | 20 |
| Example 8 | $Na_2Mn[Fe(CN)_6]$ | Secondary particle | 228 | Spherical | 0.8 | 8 | 1.86 | 60 |
| Example 9 | $Na_{1.98}Mn[Fe(CN)_6]_{0.99}$ | Secondary particle | 250 | Spherical | 2.5 | 5 | 1.83 | 80 |
| Example 10 | $Na_{1.93}Mn[Fe(CN)_6]_{0.98}$ | Secondary particle | 263 | Spherical | 2.3 | 5 | 1.82 | 70 |
| Example 11 | $Na_2Mn[Fe(CN)_6]$ | Secondary particle | 268 | Spherical | 15 | 3 | 1.78 | 15 |
| Example 12 | $Na_2Mn[Fe(CN)_6]$ | Secondary particle | 215 | Spherical | 5 | 30 | 1.85 | 70 |
| Example 13 | $Na_2Ni[Co(CN)_6]$ | Secondary particle | 219 | Spherical | 18 | 25 | 1.9 | 18 |
| Example 14 | $Na_{1.99}Ni[Co(CN)_6]_{0.99}$ | Secondary particle | 216 | Spherical | 42 | 36 | 2.02 | 10 |
| Example 15 | $Na_{1.97}Ni[Co(CN)_6]_{0.99}$ | Secondary particle | 227 | Spherical | 12 | 18 | 1.86 | 60 |
| Example 16 | $Na_{1.93}Ni[Co(CN)_6]_{0.98}$ | Secondary particle | 244 | Spherical | 7.2 | 15 | 1.78 | 72 |
| Example 17 | $Na_{1.95}Ni[Co(CN)_6]_{0.99}$ | Secondary particle | 239 | Spherical | 6 | 10 | 1.79 | 90 |
| Example 18 | $Na_{1.5}Mn[Fe(CN)_6]_{0.8}$ | Secondary particle | 235 | Spherical | 3 | 10 | 1.88 | 18 |
| Example 19 | $Na_{1.93}Mn[Fe(CN)_6]_{0.95}$ | Secondary particle | 235 | Spherical | 3 | 10 | 1.88 | 16 |
| Example 20 | $Na_{1.93}Mn[Fe(CN)_6]_{0.95}$ | Secondary particle | 235 | Spherical | 3 | 10 | 1.88 | 16 |
| Example 21 | $Na_{1.6}Mn[Fe(CN)_6]_{0.85}$ | Secondary particle | 235 | Spherical | 3 | 10 | 1.88 | 17 |
| Comparative example 1 | $Na_{0.31}Mn[Fe(CN)_6]_{0.78}$ | Primary particle | 140 | Spherical | 0.2 | 0.1 | 0.62 | 8 |
| Comparative example 2 | $Na_{1.1}Mn[Fe(CN)_6]_{0.78}$ | Primary particle | 310 | Square | 0.1 | 0.08 | 1.58 | 120 |
| Comparative example 3 | $Na_{1.56}Mn[Fe(CN)_6]_{0.88}$ | Secondary particle | 300 | Square | 0.05 | 30 | 1.85 | 20 |
| Comparative example 4 | $Na_{0.35}Mn[Fe(CN)_6]_{0.59}$ | Secondary particle | 175 | Square | 0.06 | 0.08 | 1.58 | 20 |
| Comparative example 5 | $Na_{1.98}Mn[Fe(CN)_6]_{0.99}$ | Primary particle | 100 | Square | 0.15 | 5 | 1.86 | 130 |
| Comparative example 6 | $Na_{0.28}Mn[Fe(CN)_6]_{0.57}$ | Secondary particle | 280 | Square | 0.01 | 0.05 | 1.61 | 6 |
| Comparative example 7 | $Na_{1.1}Ni[Co(CN)_6]_{0.79}$ | Primary particle | 320 | Square | 0.1 | 0.008 | 1.62 | 180 |
| Comparative example 8 | $Na_{1.2}Mn[Fe(CN)_6]_{0.7}$ | Secondary particle | 235 | Spherical | 3 | 10 | 1.88 | 29 |

In table 2, the main particle type refers to one that more than 50% of the particles have, under the field of view of the electron microscope (ZEISS Gemini SEM 300) at a magnification of 10 k. The radius of curvature of square particles of the comparative example is measured at the corner between two adjacent surfaces.

TABLE 3

Battery performance of Prussian blue-like transition
metal cyanide as positive electrode material

| No. | Capacity per gram (mAh/g) | Energy density (Wh/kg) | Rate performance (%) |
|---|---|---|---|
| Example 1 | 160 | 121.5 | 92 |
| Example 2 | 150 | 118.6 | 89 |
| Example 3 | 157 | 119.8 | 88 |
| Example 4 | 158 | 119.3 | 92 |
| Example 5 | 154 | 116.4 | 91 |
| Example 6 | 157 | 109 | 85 |
| Example 7 | 151 | 116.8 | 94 |
| Example 8 | 163 | 122.5 | 93 |
| Example 9 | 159 | 118.6 | 92 |
| Example 10 | 157 | 117.9 | 90 |
| Example 11 | 158 | 114.8 | 84 |
| Example 12 | 163 | 121.9 | 94 |
| Example 13 | 157 | 120.2 | 93 |
| Example 14 | 155 | 120.1 | 94 |
| Example 15 | 154 | 117.2 | 90 |
| Example 16 | 152 | 109.2 | 84 |
| Example 17 | 153 | 110.4 | 84 |
| Example 18 | 120 | 85.2 | 75 |
| Example 19 | 153 | 110.6 | 86 |
| Example 20 | 153 | 113.9 | 87 |
| Example 21 | 132 | 92.5 | 78 |
| Comparative example 1 | 42 | 13.5 | 52 |
| Comparative example 2 | 76 | 48.5 | 78 |
| Comparative example 3 | 21 | 17.8 | 79 |
| Comparative example 4 | 57 | 38.9 | 83 |
| Comparative example 5 | 118 | 84.9 | 74 |
| Comparative example 6 | 48 | 38.6 | 76 |
| Comparative example 7 | 69 | 45.1 | 69 |
| Comparative example 8 | 90 | 69.8 | 72 |

From the comparison of examples 1-5 and comparative examples 1-2, it can be seen that the flow rate for mixing affects the interior angle of secondary particles, the radius of curvature of primary particles and the particle size of the material. In addition to the direct mixing of the solution during injection, the interior angle of the secondary particles, the radius of curvature of the primary particles and the particle size of the material all generally increase with the increase of the flow rate for mixing. Because the particle state during mixing is inconsistent, the way of direct mixing of the solution will lead to the radius of curvature of primary particles and the particle size of materials being too small. When the flow rate for mixing is relatively high, the content of Na in the chemical formula of the Prussian blue-like transition metal cyanide significantly increases, which can increase the capacity per gram and particle size of the Prussian blue-like transition metal cyanide and also improve the compacted density of the electrode plate, thus increasing the energy density of the battery.

From the comparison of examples 1 and 6-8 and comparative examples 3-4, it can be seen that the mixing time will affect the chemical composition of the product, the interior angle of secondary particles, the radius of curvature of primary particles and the particle size of the material. From comparative example 3, it can be seen that too short mixing time will cause the agglomeration of a large number of primary particles, resulting in secondary particles with large particle size. In addition, too short mixing time will also cause the radius of curvature of primary particles to be too small, resulting in square particles. In the mixing time range of 0.5 h-48 h, the particles will agglomerate first, and then gradually disintegrate, so the particle size will first increase and then decrease. In the mixing time range of 0.5 h-48 h, the radius of curvature also increases first and then decreases. From the chemical formula and capacity per gram of comparative example 4, it can be seen that if the reaction time is too long, the transition metal element will be oxidized, the particles will be seriously disintegrated, and the radius of curvature of primary particles and the particle size of the material will decrease. Therefore, an appropriate mixing time can effectively control the particle size and morphology of particles, thus significantly improving the energy density of the battery.

From the comparison of examples 1 and 9-10 and comparative example 5, it can be seen that the concentrations of the transition metal cation and the transition metal cyanate anion will have a great influence on the interior angle of secondary particles and the radius of curvature of primary particles. When the concentrations of the transition metal cation or the transition metal cyanate anion are too low, the interior angle of secondary particles and the radius of curvature of primary particles are relatively small, resulting in square primary particles. If the concentrations of transition metal cations and transition metal cyanate anions are both greater than or equal to 0.1 mol/L, but the concentration difference between transition metal cations and transition metal cyanate anions increases, the interior angle of the secondary particles will increase, and the particle size of the material will decrease. Therefore, suitable concentrations of the transition metal cation and the transition metal cyanate anion can improve the energy density of the battery.

From the comparison of examples 1 and 11 and comparative example 6, it can be seen that the temperature of the heated solution will affect the radius of curvature of primary particles and the particle size of the material. When the temperature of the solution is too low, the degree of supersaturation of the Prussian blue-like transition metal cyanide will be significantly increased, which will make the crystal nucleate quickly and form small particles. If the temperature of the solution is too low, square particles will also be produced. When the temperature of the solution is higher, the secondary particle crystals are easily disintegrated, resulting in smaller secondary particles. However, a higher solution temperature is still beneficial to increase the radius of curvature of primary particles, resulting in higher degree of sphericity. The increase of the solution temperature can also greatly increase the content of Na in the Prussian blue-like transition metal cyanide, which can increase the capacity per gram and particle size of the Prussian blue-like transition metal cyanide and also improve the compacted density of the electrode plate, thus improving the energy density of the battery.

From the comparison of example 1 and example 12, it can be seen that the adding sequence will affect the radius of curvature of primary particles and the particle size of the material. Larger secondary particles will be obtained by adding the first solution into the second solution, but the radius of curvature of primary particles will be reduced relative to the particle size of overall particles, and the obtained Prussian blue-like transition metal cyanide will have a higher capacity per gram, which is beneficial to make the battery have a higher energy density.

From the comparison of examples 1, 18-21 and comparative example 8, it can be seen that aging time will affect the structural integrity of the Prussian blue-like transition metal cyanide. An appropriate aging time can improve the structure integrity of the Prussian blue-like transition metal cyanide, increase the content of Na and decrease the defect of $Fe(CN)_6^{4-}$. In addition, due to the increase in the active Na ions, the powder resistivity of the Prussian blue-like transition metal cyanide can be reduced, so as to improve the rate performance and cycling performance of a battery.

It is also to be understood that the embodiments described above may be appropriately modified and varied by those skilled in the art in light of the disclosure and teachings from the description above. Therefore, the present application is not limited to the specific embodiments as disclosed and described above, and modifications and variations of the present application should fall within the scope of protection defined by the claims of the present application. In addition, although some specific terms have been used in the specification, these terms are merely used for ease of description, but do not constitute any limitation to the present application.

What is claimed is:

1. A Prussian blue-like transition metal cyanide, comprising secondary particles which comprise a plurality of primary particles, wherein the primary particles have a spherical or spherical-like morphology,
   wherein the primary particles have a radius of curvature equal to or larger than 0.8 μm.

2. The Prussian blue-like transition metal cyanide according to claim 1, wherein the secondary particles have an interior angle of 150° to 300°.

3. The Prussian blue-like transition metal cyanide according to claim 1, wherein the Prussian blue-like transition metal cyanide has a volume-average particle size $D_v50$ equal to or larger than 1 μm.

4. The Prussian blue-like transition metal cyanide according to claim 1, wherein the Prussian blue-like transition metal cyanide has a powder compacted density of 1.7 $g/cm^3$ to 2.1 $g/cm^3$ under a pressure of 600 MPa.

5. The Prussian blue-like transition metal cyanide according to claim 1, wherein the Prussian blue-like transition metal cyanide includes $AxM^1[M^2(CN)_6]_y$, in which
   A is selected from one or more of alkali metal ions and alkaline earth metal ions;
   $M^1$ is selected from one or more of Mn, Ni, Cu, Co, Fe, Zn, and Cr;
   $M^2$ is selected from one or more of Mn, Ni, Cu, Co, Fe, Zn, and Cr;
   $1.5 \leq x \leq 2$; and
   $0.6 \leq y \leq 1$.

6. The Prussian blue-like transition metal cyanide according to claim 1, wherein the Prussian blue-like transition metal cyanide has a powder resistivity of 10 kΩ·cm to 100 kΩ·cm under a pressure of 12 MPa.

7. The Prussian blue-like transition metal cyanide according to claim 1, wherein the Prussian blue-like transition metal cyanide has a capacity per gram of 140 mAh/g to 170 mAh/g.

8. A secondary battery, comprising a positive electrode plate, the positive electrode plate comprising a positive electrode material, wherein the positive electrode material includes a Prussian blue-like transition metal cyanide according to claim 1.

9. The Prussian blue-like transition metal cyanide according to claim 1, wherein the Prussian blue-like transition metal cyanide has a volume-average particle size $D_v50$ equal to or larger than 15 μm.

* * * * *